July 8, 1924.
R. ALFISI
1,500,980
IDENTIFICATION DEVICE FOR VEHICLES
Filed Oct. 26, 1923
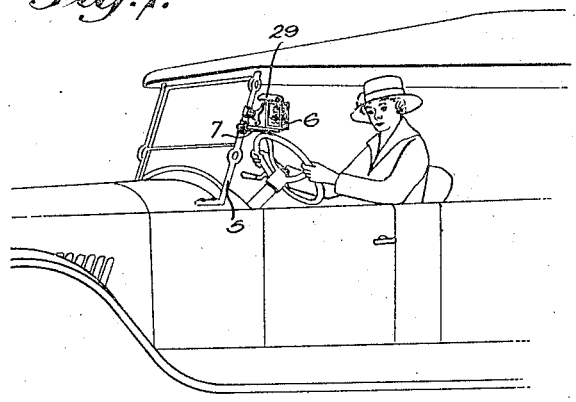
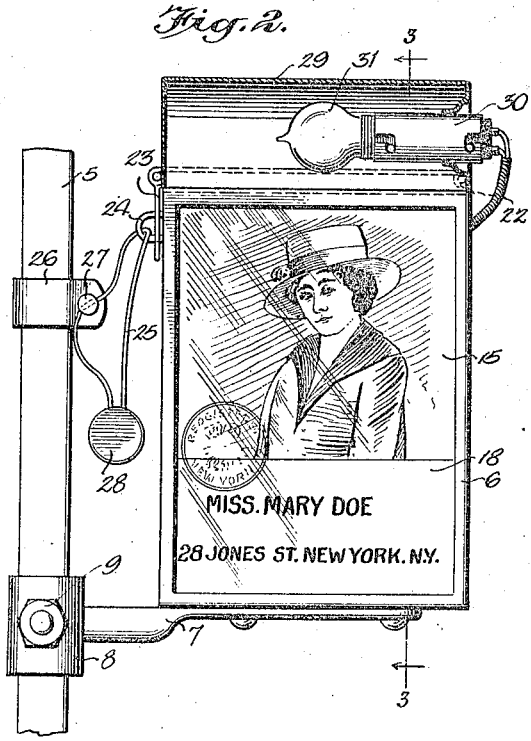
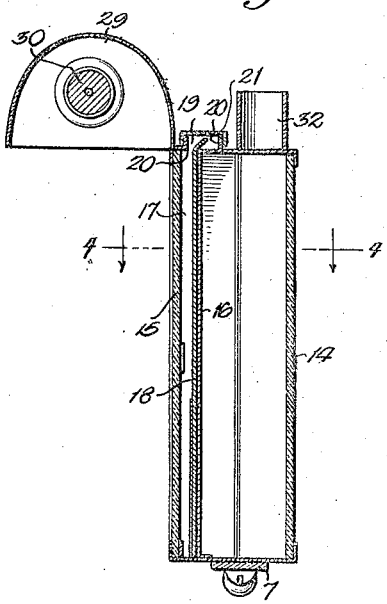
WITNESSES
INVENTOR
R. ALFISI
BY
ATTORNEYS Patented July 8, 1924.

1,500,980

UNITED STATES PATENT OFFICE.

RAFFAELE ALFISI, OF BROOKLYN, NEW YORK.

IDENTIFICATION DEVICE FOR VEHICLES.

Application filed October 26, 1923. Serial No. 671,035.

*To all whom it may concern:*

Be it known that I, RAFFAELE ALFISI, a subject of the King of Italy, and a resident of the city of New York, borough of Brooklyn, in the county of Kings and State of New York, have invented a new and Improved Identification Device for Vehicles, of which the following is a full, clear, and exact description.

This invention relates to improvements in identification means for drivers of vehicles, and has particular reference to a holder for containing such identification means.

An object of the invention is to provide an improved holder which may be readily attached to a convenient part of a vehicle in such manner that the identification means cannot be removed from the holder without detection, and in which said means is clearly visible at all times so that the identification of the driver of the vehicle may be readily ascertained.

The above and other objects will appear more clearly from the following detail description, when taken in connection with the accompanying drawing, which illustrates a preferred embodiment of the inventive idea.

In the drawing—

Figure 1 is a fragmentary perspective view of a motor vehicle showing the invention attached thereto;

Figure 2 is a front elevation of the device, partly shown in section;

Figure 3 is a section on the line 3—3 of Figure 2; and

Figure 4 is a transverse section on the line 4—4 of Figure 3.

The invention is shown as applied to the wind shield frame 5 of a motor vehicle, but it is to be understood that the device may also be attached to other convenient parts of the vehicle without departing from the spirit or scope of the invention.

In attaching the device, which consists generally of a casing 6, to the wind shield frame 5 of the vehicle use is made of a bracket 7 secured to the bottom of the casing and extending laterally therefrom, the projecting end of the bracket being provided with a sleeve or collar 8, which may be secured to the wind shield frame 5 by a set screw 9 or other suitable means. The sides 10 and 11 of the casing 6 are of different widths, as clearly shown in Figure 4, and opposed vertical edges thereof are inturned, as indicated at 12, to cooperate with the flanges 13 for forming a groove to receive the vertical edges of a mirror 14 forming the rear face of the casing. By reason of the different widths of the sides 10 and 11 of the casing the mirror 14 is disposed at an angle with respect to the front of the casing so as to enable the driver of the vehicle to readily ascertain what is in the rear thereof.

The front face of the casing is formed by the glass 15 suitably mounted in the casing and combines with the partition 16 disposed in the forward portion of said casing to form a compartment 17 for receiving the identification means 18. This identification means is in the form of a card having the photograph, name and address of the driver printed thereon and stamped by the proper authorities to indicate that the person identified by the card has been properly registered. The compartment 17 has an opening 19 in the top thereof extending for substantially the entire width of the casing so that the card 19 may be readily inserted into the compartment and placed in a position to be visible through the transparent front 15 of the casing. Extending upwardly from the top of the casing adjacent the opening 19 are the flanges 20 which are normally engaged by a channeled closure 21 hingedly connected to one side of the casing, as indicated in dotted lines at 22. The end of the cover opposite its hinged connection with the casing is provided with a pivoted latch 23 which is engageable over a hasp or staple 24 carried by the adjacent side of the casing. After the identification card 18 has been inserted into the compartment 17 the closure 21 is swung to a closing position and a flexible element 25, such as wire, is passed through the staple 24. A clamp 26 is also utilized in connection with the invention and is preferably secured to the frame 5 adjacent the sleve 8 and secured in position by means of a screw 27 provided in one end thereof with an opening through which one end of the wire 25 may be passed. The ends of the wire 25 are then secured together by means of a seal 28 thus forming a closed loop which provides a lock for the closure or cover 21 and necessitating the breaking of the seal 28 in order to obtain access to the interior of the casing. Should this be done and another identification card substituted for the original, the fact that the seal is broken may be readily ascertained and the deception detected.

In order that the identification card will at all times be clearly visible the casing is provided upon its front and at the top thereof with a reflector 29 having an opening in one end thereof for receiving a lamp socket 30 carrying the lamp 31, which may be illuminated in any desired manner. The top of the casing rearwardly of the closure 21 may also be provided with a socket 32 forming a pivotal mounting for what are generally known as spot lights or road lamps.

What is claimed is:

1. In an identification device for vehicles, a casing having a transparent front, a partition in said casing combining with said front to form a compartment for receiving an identification card, said compartment having an opening, a closure for said opening pivotally connected to said casing, a latch carried by said closure, a hasp carried by said casing for receiving said latch, and means engageable with said hasp for latching said closure in closing position.

2. In an identification device for vehicles, a casing having a transparent front, a partition in said casing combining with said front to form a compartment for receiving an identification card, a closure for said compartment connected to said casing, latching means for said closure, and means engageable with said latching means and connected to a part of a vehicle for retaining said latching means in operative position.

RAFFAELE ALFISI.